US009641504B2

(12) United States Patent
Stevens et al.

(10) Patent No.: US 9,641,504 B2
(45) Date of Patent: May 2, 2017

(54) HTTP HEADER-BASED ADAPTABLE AUTHENTICATION MECHANISM

(71) Applicant: SAP SE, Walldorf (DE)

(72) Inventors: Karl Stevens, Arlington Heights, IL (US); Jason Hoos, Schaumburg, IL (US); John Hall, Chicago, IL (US); Yunjiao Xue, Waterloo (CA); Steven Wang, Waterloo (CA); Senthil Natarajan, Chicago, IL (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/570,734

(22) Filed: Dec. 15, 2014

(65) Prior Publication Data

US 2016/0173466 A1    Jun. 16, 2016

(51) Int. Cl.
| | | |
|---|---|---|
| *G06F 7/04* | (2006.01) | |
| *H04L 29/06* | (2006.01) | |
| *H04W 4/00* | (2009.01) | |
| *H04W 12/06* | (2009.01) | |

(52) U.S. Cl.
CPC ............. *H04L 63/08* (2013.01); *H04W 4/003* (2013.01); *H04W 12/06* (2013.01); *H04L 2463/082* (2013.01)

(58) Field of Classification Search
CPC ... H04L 63/08; H04L 2463/082; H04W 12/06
See application file for complete search history.

(56) References Cited

U.S. PATENT DOCUMENTS

| | | | | |
|---|---|---|---|---|
| 6,606,663 B1* | 8/2003 | Liao | ........................ | G06Q 20/20 705/25 |
| 7,322,040 B1* | 1/2008 | Olson | ...................... | G06F 21/31 726/2 |
| 8,266,680 B2* | 9/2012 | James | ...................... | H04L 63/08 709/203 |
| 9,172,753 B1* | 10/2015 | Jiang | ................... | H04L 67/1097 |
| 2003/0005280 A1* | 1/2003 | Bobde | ............... | H04L 29/06027 713/150 |
| 2006/0021004 A1* | 1/2006 | Moran | ..................... | H04L 63/08 726/2 |

(Continued)

*Primary Examiner* — Techane Gergiso
(74) *Attorney, Agent, or Firm* — Jones Day (57) ABSTRACT

The disclosure is generally directed to systems and methods for HTTP header-based authentication. For example, the systems and methods include receiving, at a mobile platform server, a first request message from a client device, the first request message requesting to download an application from the mobile platform server, sending, to the client device, a first response message having a first authentication query within header portions of the first response message, receiving, at the mobile platform server, a second request message having first authentication credentials within header portions of the second request message, sending, to the client device, a second response message having a second authentication query within header portions of the second response message, receiving, at the mobile platform server first device, a third request message having second authentication credentials within header portions of the third request message, and sending, to the client device, the application.

16 Claims, 5 Drawing Sheets

(56) References Cited

U.S. PATENT DOCUMENTS

| | | | |
|---|---|---|---|
| 2006/0101510 A1* | 5/2006 | Kadyk | H04L 63/0281 726/12 |
| 2006/0174127 A1* | 8/2006 | Kalavade | H04L 63/08 713/176 |
| 2006/0236387 A1* | 10/2006 | Ballinger | H04L 63/08 726/14 |
| 2007/0005801 A1* | 1/2007 | Kumar | H04L 63/08 709/238 |
| 2007/0289005 A1* | 12/2007 | Kumar | H04L 63/08 726/10 |
| 2008/0077809 A1* | 3/2008 | Hayler | G06F 12/1466 713/193 |
| 2008/0120715 A1* | 5/2008 | Bhargava | H04L 63/08 726/14 |
| 2008/0271121 A1* | 10/2008 | Hinton | H04L 63/0815 726/4 |
| 2010/0064134 A1* | 3/2010 | Gross | H04L 63/0815 713/155 |
| 2010/0138485 A1* | 6/2010 | Chow | G06F 17/30902 709/203 |
| 2010/0146269 A1* | 6/2010 | Baskaran | G06F 21/10 713/165 |
| 2010/0251338 A1* | 9/2010 | James | H04L 63/08 726/4 |
| 2010/0251345 A1* | 9/2010 | James | H04L 63/08 726/5 |
| 2010/0293385 A1* | 11/2010 | Nanda | H04L 63/166 713/176 |
| 2012/0005738 A1* | 1/2012 | Manini | H04L 63/0209 726/7 |
| 2012/0151567 A1* | 6/2012 | Chayanam | G06F 21/34 726/7 |
| 2013/0174241 A1* | 7/2013 | Cha | H04L 63/0815 726/7 |
| 2013/0318581 A1* | 11/2013 | Counterman | H04W 12/06 726/7 |
| 2014/0026203 A1* | 1/2014 | Ho | H04L 63/08 726/9 |
| 2014/0057599 A1* | 2/2014 | Hazari | H04W 12/06 455/411 |
| 2014/0089671 A1* | 3/2014 | Logue | H04L 63/0884 713/182 |
| 2014/0245372 A1* | 8/2014 | Elias | H04L 63/20 726/1 |
| 2014/0282919 A1* | 9/2014 | Mason | H04L 63/0807 726/4 |
| 2016/0119343 A1* | 4/2016 | Salmela | H04W 12/04 726/7 |

\* cited by examiner

HTTP HEADER-BASED ADAPTABLE AUTHENTICATION MECHANISM

FIELD OF INVENTION

The embodiments of the disclosure are generally directed to authentication techniques, and in particular to HyperText Transfer Protocol (HTTP) header-based authentication mechanisms.

BACKGROUND

Today, various application development tools have been introduced to facilitate in the development and maintenance of mobile software applications. For example, SAP® (Walldorf, Germany) has developed one such enterprise mobility platform, known as SMP (SAP Mobile Platform). As a platform, SMP may manage the entire life cycle of mobile applications for an enterprise, including application development, application deployment, application execution, application management, and mobile device management. In addition, such mobility platforms enable business analysts and developers to quickly develop and deploy mobile applications with specific business objectives and functionality.

In light of the ever increasing concern for data and device security, a variety of authentication measures may be utilized for communications between client and server devices. For example, a default authentication may be based upon a username and password combination entered on a login screen of a mobile application on a mobile device. In some instances, a Secure Sockets Layer (SSL) certificate may be used to ensure that the client device is authorized and trusted.

For some mobile applications, conventional authentication measures may be insufficient. For example, an administrator may desire additional types of authentication on a deployed mobile application's security profile.

Existing application development tools fail to enable mobile application developers to provide flexible authentication mechanisms. Accordingly, the inventors have identified a need for an improved system and method for authenticating mechanisms between a remote device and an application server.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

DETAILED DESCRIPTION

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments. Wherever possible, like reference numbers will be used for like elements.

The embodiments are generally directed to systems and methods for HTTP header-based authentication. For example, the systems and methods include receiving, at a mobile platform server, a first request message from a client device, the first request message requesting to download an application from the mobile platform server, sending, to the client device, a first response message having a first authentication query within header portions of the first response message, receiving, at the mobile platform server, a second request message having first authentication credentials within header portions of the second request message, sending, to the client device, a second response message having a second authentication query within header portions of the second response message, receiving, at the mobile platform server first device, a third request message having second authentication credentials within header portions of the third request message, and sending, to the client device, the application.

In another example, the systems and methods include sending, at the client device, a first request message to a mobile platform server device, the first request message requesting to download an application from the mobile platform server device, receiving, from the mobile platform server device, a first response message having a first authentication query within header portions of the first response message, generating, at the client device, a first user interface to prompt an end user for first authentication credentials, sending, at the client device, a second request message having the first authentication credentials within header portions of the second request message, receiving, from the mobile platform server device, a second response message having a second authentication query within header portions of the second response message, generating, at the client device, a second user interface to prompt an end user for second authentication credentials, sending, at the client device, a third request message having the second authentication credentials within header portions of the third request message, and receiving, from the second device, the application.

Figure 1:
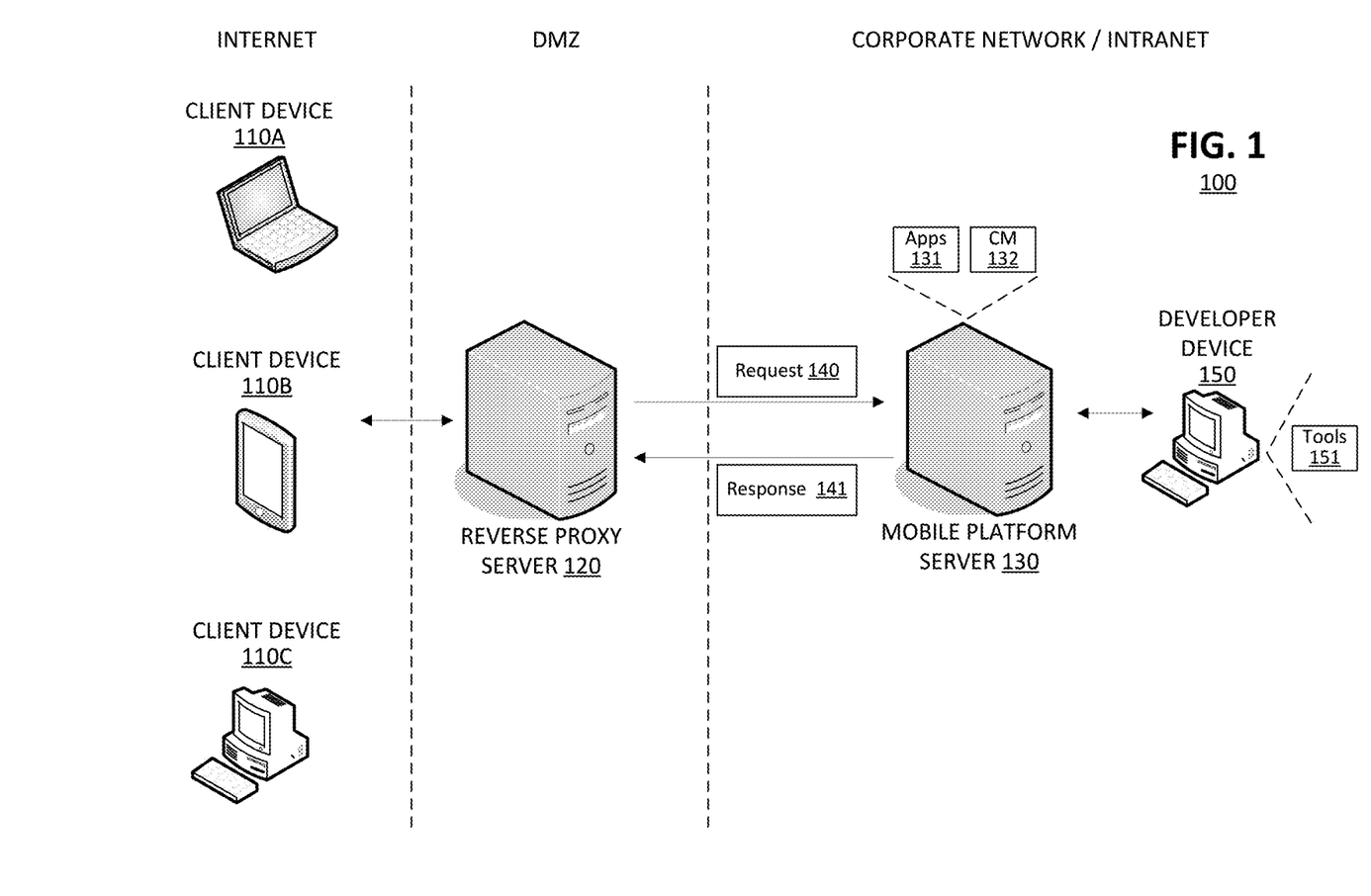
FIG. 1 is a system diagram depicting an architectural overview of a networked system for facilitating application development and deployment according to an example embodiment.

FIG. 1 is a system diagram depicting an architectural overview of a networked system for application development and deployment according to an example embodiment. The example networked system 100 includes client devices 110A, 110B, 110C, reverse proxy server 120, mobile platform server 130, and developer device 150.

One or more client devices, such as client devices 110A, 110B, 110C, may be accessible via an Internet connection, and connected to a reverse proxy server 120 server in a network demilitarized zone (DMZ). Although not shown, the DMZ and/or corporate network may also include one or more load balancing servers. Client devices 110A, 110B, 110C may comprise a variety of devices which may include, for example, a mobile device (e.g., mobile phone or a smartphone), a personal computer, a laptop, a tablet, or the like. Accordingly, the various client device types may operate using variety operating systems (e.g., Android, iOS, Linux, Windows, etc.). Although not shown, the "client" device also may be a server device of another network in some instances.

Each of the client devices 110A, 110B, 110C is configured to transmit and receive respective HTTP communications with the mobile platform server 130. The respective HTTP communications may include one or more requests 140 and one or more responses 141. In addition, client devices 110A, 110B, 110C may be configured to download one or more applications 131 from the mobile platform server 130. By interpreting the definitions of a downloaded application 131, a client device 110 may present a functioning mobile application to an end user.

The reverse proxy server 120 is configured to transmit request(s) 140 to an enterprise data system such as a mobile platform server 130 in a corporate intranet/backend network. Subsequently, the reverse proxy server 120 may receive response(s) 141 from the mobile platform server 130. The response(s) 141 may be transmitted from the reverse proxy server 120 to the appropriate client device 110A, 110B, 110C.

In some instances, a gateway (not shown) may be disposed between the reverse proxy server 120 and the mobile platform server 130. The optional gateway may translate requests (e.g., 140) to proprietary protocols, such as remote function call (RFC). Here, the gateway may translate responses (e.g., 141) using a proprietary protocol back to HTTP.

Mobile platform server 130 may store one or more applications and/or application updates, collectively referred to as applications 131. For example, applications 131 may be managed by SAP® Agentry Runtime as a component of mobile platform server. In addition, the mobile platform server 130 may include one or more credentials modules 132 for authenticating request(s) 140 from client devices 110A, 110B, 110C, such as a request to download one or more applications 131. The mobile platform server 130 may be configured to process the request(s) 140, retrieve data, and/or perform data operations as an appropriate response to a request 140. In addition, the mobile platform server 130 may return response(s) 141 for transmission back to the reverse proxy server 120. Lastly, the mobile platform server 130 may be a standalone platform or it may be integrated with other enterprise systems.

A development device 150 may use development tools 151 (e.g., SAP® Agentry Editor and OpenUI SDK) to develop and deploy applications 131. A single application 131 may be developed for a variety of operating environments, host devices, and/or operating systems (e.g., Android, iOS, Linux, Windows, etc.). Although the development device 150 is illustrated within the corporate network, the location of the deployment device is not so limited. For example, the development device 150 may be connected to the mobile platform server 150 through an Internet connection.

Within mobile platform server 130, credentials modules 132 may authenticate request(s) 140 from client devices 110A, 110B, 110C, such as a request to download one or more applications 131. For example, the credential modules 132 may enable a variety of authentication techniques using HTTP headers. The credential modules 132 may evaluate headers of a request 140 (e.g., most recent request to mobile platform server 130), and generate HTTP headers within a response 141. In addition, the credential modules 132 may enable authentication schemes that require a series of HTTP requests. In some instances, a request counter may be used to ensure that a predetermined number of authentication techniques have been used in respective HTTP requests. Of course, if an authentication request fails, a client device 110 may be denied access to an application 131.

A variety of authentication schemes may be used in accordance with the various embodiments. Example authentication schemes include username and password combinations, SSL certificates, basic authentication, Kerberos, remote authentication dial in user service (RADIUS), open standard authorization (OAuth), security assertion markup language (SAML), or the like. The embodiments are not limited to any particular authentication mechanisms.

By using the various embodiments, the functionality of a mobile platform (e.g., SAP® SMP) may be extended. In addition to enabling customers to extend the appearance and functionality of a mobile application, application developers, including third party developers, may provide enhanced interfaces for authentication. For example, third party developers may write code to adopt one or more of the various authentication mechanisms. Using improved application programming interfaces (API), such developers may select one or more authentication mechanisms, and the resulting applications may prompt end users for respective authentications credentials. The authentication information may be communicated within HTTP headers between client device 110 and mobile platform server 130.

Figure 2:
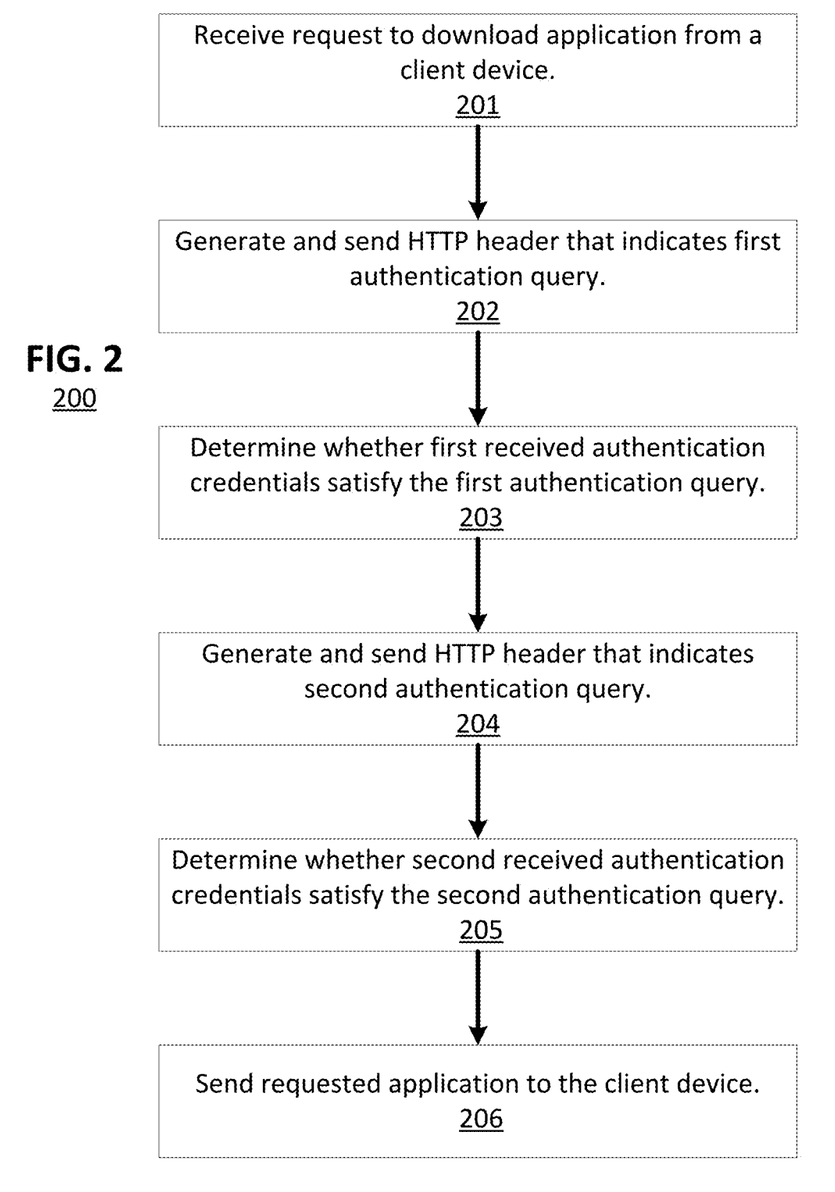
FIG. 2 illustrates a server implemented method for HTTP header-based authentication according to an example embodiment.

FIG. 2 illustrates a server implemented method 200 for HTTP header-based authentication according to an example embodiment of the present disclosure that utilizes multiple authentication queries.

At 201, the mobile platform server 130 may receive a request message from a client device 110 to download a mobile application 131. For example, the client device 110 may request an update to an already downloaded application, or may begin an initial download.

At 202, the mobile platform server 130 may generate a response message that includes a first authentication query within the HTTP header of the response message. The response message may be transferred to the client device 110. Upon receipt of the response message, the client device 110 may analyze the header of the response message and may be configured to dynamically generate a user interface based on the first authentication query. For example, the user interface may prompt the end user of the client device 110 for information requested by the first authentication query.

Next, at 203, the mobile platform server 130 may receive another request message including the first authentication credentials. Here, the first authentication credentials may be transmitted within a header of an HTTP request message. Upon their receipt, the credential modules 132 of the mobile platform server 130 may validate whether the first authentication credentials satisfy the first authentication query.

If the first received credentials satisfy the conditions stored within the credential modules 132, the mobile platform server 130 may generate another response that includes a second authentication query within the HTTP header of a response message. The response message may be transmitted to the client device 110. Here again, the client device 110 may be configured to generate another user interface based on the second authentication query. However, if the first received credentials do not satisfy the conditions stored within the credential modules 132, the client device 110 may be either denied access to the requested application 131, or may be re-prompted for credential information from the end user for the first authentication query.

Next, at 204, the mobile platform server 130 may receive another request message including the second authentication credentials. Here, the second authentication credentials may be transmitted within a header of an HTTP request message. Upon their receipt, the credential modules 132 may validate whether the second received authentication satisfy the second authentication query.

At 205, the credential modules 132 may determine whether the second authentication credentials satisfy the second authentication query. If the second authentication credentials satisfy the conditions stored within the credential modules 132, the mobile platform server 130 may initiate transmission of the requested application 131 to the client device 110, at 206. Alternatively, the mobile platform server 130 may generate another response that includes yet another (i.e., third, fourth, etc.) authentication query within the HTTP header of the response.

Although the method 200 illustrates two authentication queries, the embodiments are not so limited and a plurality of authentication queries challenges may be used. Of course, if the second or subsequently received credentials do not satisfy the conditions stored within the credential modules 132, the client device 110 may be denied access to the requested application 131, or may be re-prompted for credential information from the end user for the second or subsequent authentication query.

Figure 3:
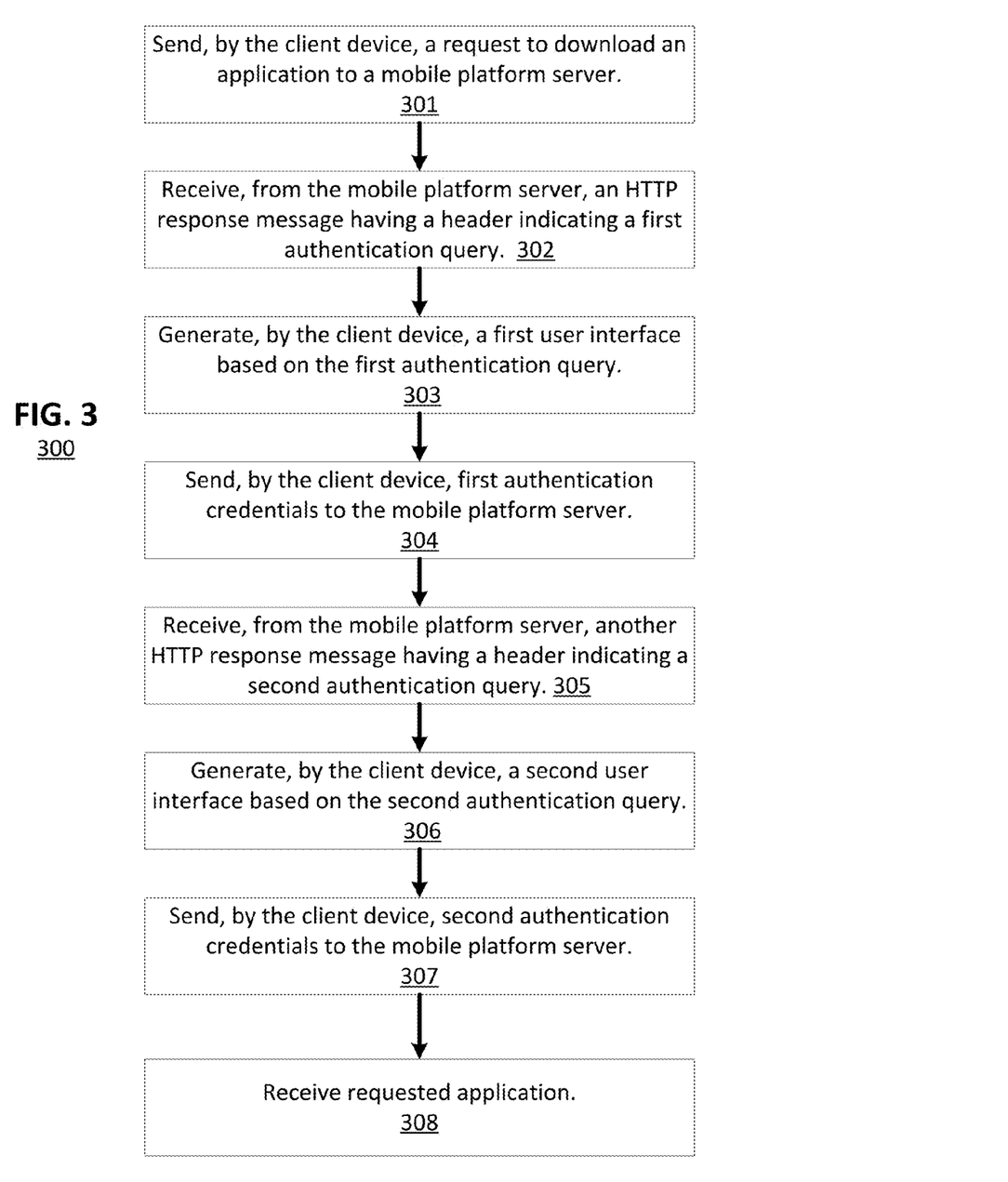
FIG. 3 illustrates a client implemented method for HTTP header-based authentication according to an example embodiment.

FIG. 3 illustrates a client implemented method 300 for HTTP header-based authentication according to an example embodiment of the present disclosure that utilizes multiple authentication queries.

At 301, the client device 110 may transmit a request message to a mobile platform server 130 soliciting the download of an application 131. For example, the client device 110 may request an update to an already downloaded application, or may begin an initial download.

At 302, the client device 110 may receive a response message that includes a first authentication query within the HTTP header of a response message. At 303, the client device 110 may analyze the header of the response message and may be configured to dynamically generate a user interface based on the first authentication query. For example, the user interface may prompt the end user of the client device 110 for information requested by the first authentication query.

Next, at 304, the client device 110 may transmit first authentication credentials to mobile platform server 130. Here, the first authentication credentials may be transmitted within a header of an HTTP request message. The mobile platform server 130 may validate whether the first authentication credentials satisfy the first authentication query. If the first authentication credentials satisfy the conditions stored within the credential modules 132, the mobile platform server 130 may generate another response that includes a second authentication query within the HTTP header of the response.

The second authentication query is received by the client device 110, at 305. Here, the client device 110 may be configured to dynamically generate another user interface based on the second authentication query, at 306. Next, at 307, the client device 110 may transmit second authentication credentials to the mobile platform server 130. The second received credentials may be transmitted within a header of an HTTP request message.

The credential modules 132 of the mobile platform server 130 may determine whether the second authentication credentials satisfy the second authentication query. If the second authentication credentials satisfy the conditions stored within the credential modules 132, the mobile platform server 130 may initiate transmission of the requested application 131 to the client device 110, at 308. Alternatively, the mobile platform server 130 may generate another response that includes yet another authentication query within the HTTP header of the response. Although the method 300 illustrates the receipt of two authentication queries, the embodiments are not so limited and a plurality of authentication queries may be used.

Figure 4:
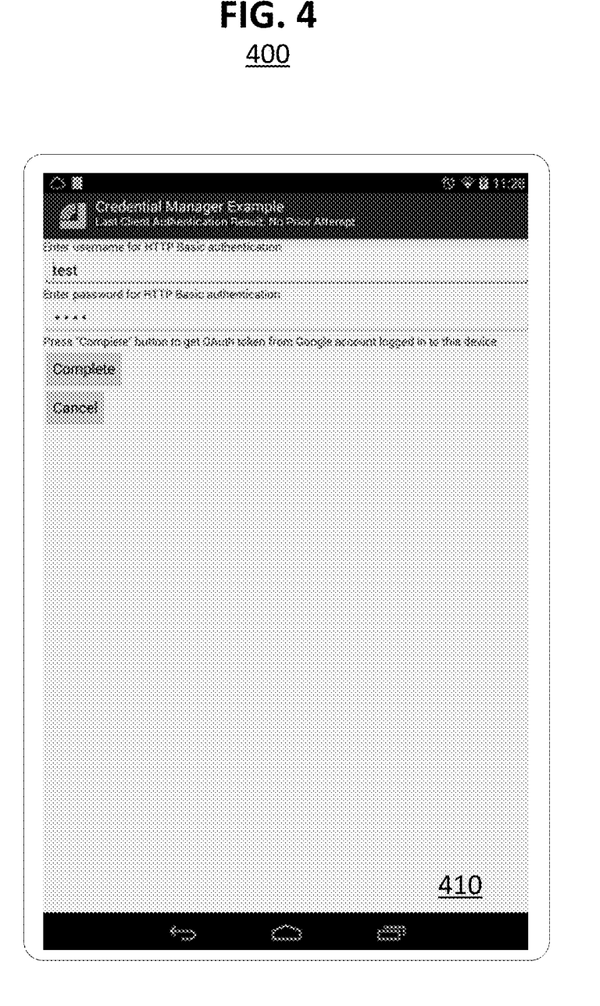
FIG. 4 illustrates an example authentication screen according to an example embodiment.

FIG. 4 illustrates an example authentication screen according to an example embodiment. As shown in FIG. 4, the client device 400 may be configured to dynamically generate one or more user interfaces based upon a respective authentication query. The user interface 410 may be generated to prompt an end user of the client device 400 for various information types (e.g., usernames, passwords, security certificates, tokens, etc.). In some instances, the data needed for authentication may be retrieved from the client device 400 without prompting an end user through user interface 410. For example, the identity of an end user associated with a client device 410 may be verified. In another example, a security certificate or authorization token may be retrieved from the memory of the client device 410 or a third-party service.

Figure 5:
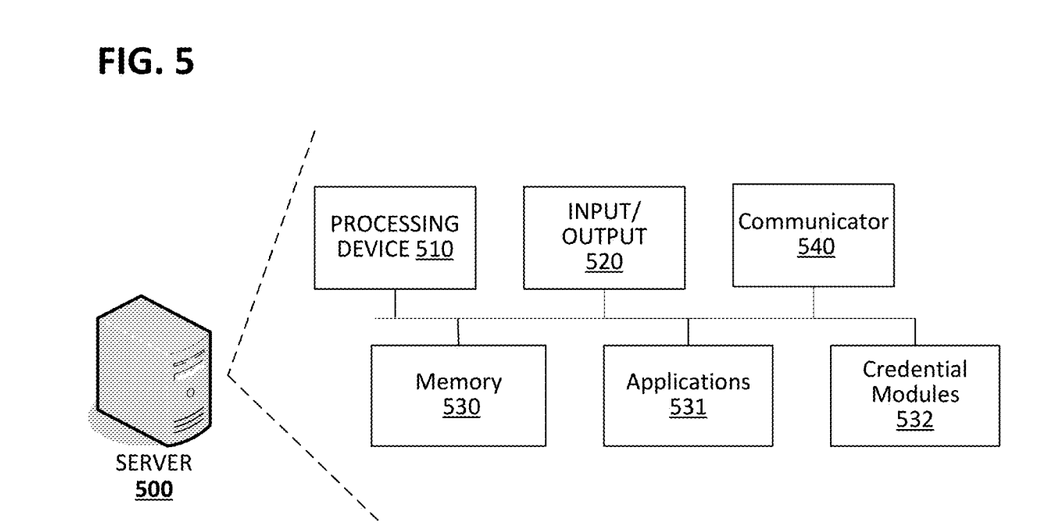
FIG. 5 illustrates a representative architecture of a mobile platform server according to an example embodiment.

FIG. 5 illustrates a representative architecture of a mobile platform server 500 according to an example embodiment. Mobile platform server 500 may include processing device 510, input/output modules 520, memory 530, and communications device 540. Mobile platform server 500 may further include one or more applications 531, credential modules 532, and/or other modules or components that generally implement the functionality of the mobile platform server 500. The components and functions of the mobile platform server 500 are also explained in detail with reference to FIGS. 1 and 2.

Processing device 510 may execute instructions of credential modules 532 and other modules stored in memory 530. Memory 530 may include a computer readable medium storing applications 531 and credential modules 532. In an example embodiment, memory 530 may contain different components for retrieving, presenting, changing, and saving data and may include computer readable media. Memory 530 may include a variety of memory devices, for example, Dynamic Random Access Memory (DRAM), Static RAM (SRAM), flash memory, cache memory, and other memory devices. Additionally, for example, memory 530 and processing device(s) 510 may be distributed across several different computers that collectively comprise a system. Memory 530 may be capable of storing client and backend inputs.

Components of mobile platform server 500, such as processing device 510, memory 510, and a communications device 540, may be interconnected via a system bus. In various embodiments, the mobile platform server 500 may have an architecture with modular hardware and/or software systems that include additional and/or different systems communicating through one or more networks via communications device 540.

Communications device 540 may enable connectivity between the processing devices 510 in the mobile platform server 500 and other systems by encoding data to be sent from the processing device 510 to another system over a network and decoding data received from another system over the network for the processing device 510.

Processing device 510 may perform computation and control functions of a system and comprises a suitable central processing unit (CPU). Processing device 510 may include a single integrated circuit, such as a microprocessing device, or may include any suitable number of integrated circuit devices and/or circuit boards working in cooperation to accomplish the functions of a processing device. Processing device 510 may execute computer programs, such as object-oriented computer programs, within memory 530.

Although example credential modules 532 are depicted as a single entity, it is to be appreciated that credential modules 532 may include fewer or more modules and components, and may be integrated into a single system from the operation of independent systems and subsystems. For example, the credential modules 532 may operate as a standalone service which provides data to the mobile platform server 500. Further, additional and different modules and other types of integration with the backend server and/or the requesting client device may be provided.

Each of the client devices, the reverse proxy server, gateway, mobile platform server, and other processing components depicted in FIGS. 1 and 5 may be embodied, individually or in combination, in a computing device in the form of, for example, a personal computer, a server computer, a mobile computer, or any other suitable computing device. In various embodiments, the computing device may be used to implement computer programs, logic, applications, methods, processes, or software to provide data transformation operations, as described herein. Although mobile client scenarios are illustrated, it will be understood that the applicability of the presently described data transformation techniques and components are not limited to mobile client scenarios. A variety of clients and client types (including combinations of mobile and non-mobile client types) may be used.

With respect to the depicted system configurations depicted, it should be appreciated that in other embodiments, the systems and network configurations may include fewer or more components apart from those shown. For example, in example embodiments, the data services provided in the corporate intranet/backend can be integrated within fewer or additional components. The components and respective modules may be in the form of software that is processed by a processor. In another example, the components and respective modules may be in the form of firmware that is processed by application specific integrated circuits (ASIC), which may be integrated into a circuit board. The components and respective modules also may be in the form of one or more logic blocks included in a programmable logic device (for example, a field programmable gate array). The components and respective modules may be adapted, and/or additional structures may be provided, to provide alternative or additional functionalities beyond those specifically discussed.

It will be apparent to those skilled in the art that various modifications and variations can be made in the systems and methods for HTTP header-based authentication without departing from the spirit or scope of the disclosure. Thus, it is intended that the present disclosure cover the modifications and variations of this disclosure provided they come within the scope of the appended claims and their equivalents.

We claim:

1. A computer-implemented method for exchanging data using a data transfer protocol between a first device and a second device, the method comprising:
   receiving, at the first device, a first request message from a second device, the first request message requesting to download an application from the first device;
   responsive to receipt of the first request message, sending, to the second device, a first response message having a first authentication query within header portions of the first response message;
   receiving, at the first device, a second request message having first authentication credentials within header portions of the second request message, the first authentication credentials being responsive to the first authentication query;
   determining whether the first authentication credentials satisfy the first authentication query;
   responsive to determining that the first authentication credentials satisfy the first authentication query, sending, to the second device, a second response message having a second authentication query within header portions of the second response message;
   receiving, at the first device, a third request message having second authentication credentials within header portions of the third request message, the second authentication credentials being responsive to the second authentication query;
   determining whether the second authentication credentials satisfy the second authentication query, wherein each of the first and second authentication credentials rely upon different security mechanisms;
   responsive to determining that the second authentication credentials satisfy the second authentication query; and
   transmitting, to the second device, the application upon a predetermined number of authentication techniques having been used as determined by a request counter that updates in connection with the authentication queries.

2. The method according to claim 1, wherein the data transfer protocol standard is a hypertext transfer protocol (HTTP).

3. The method according to claim 1, wherein the second authentication credential is selected from secure sockets layer certificates, authorization tokens, basic authentication, Kerberos authentication, remote authentication dial in user service (RADIUS), and security assertion markup language (SAML) mechanisms.

4. The method according to claim 3, wherein a subsequent third authentication credential is selected from secure sockets layer certificates, authorization tokens, basic authentication, Kerberos authentication, remote authentication dial in user service (RADIUS), and security assertion markup language (SAML) mechanisms, and differs from the second authentication credential, ensured by the use of the request counter.

5. A non-transitory computer readable storage medium storing one or more programs configured to be executed by a processor, the one or more programs for exchanging data using a data transfer protocol between a first device and a second device, and comprising instructions for:
   receiving, at the first device, a first request message from a second device, the first request message requesting to download an application from the first device;

responsive to receipt of the first request message, sending, to the second device, a first response message having a first authentication query within header portions of the first response message;

receiving, at the first device, a second request message having first authentication credentials within header portions of the second request message, the first authentication credentials being responsive to the first authentication query;

determining whether the first authentication credentials satisfy the first authentication query;

responsive to determining that the first authentication credentials satisfy the first authentication query, sending, to the second device, a second response message having a second authentication query within header portions of the second response message;

receiving, at the first device, a third request message having second authentication credentials within header portions of the third request message, the second authentication credentials being responsive to the second authentication query;

determining whether the second authentication credentials satisfy the second authentication query, wherein each of the first and second authentication credentials rely upon different security mechanisms;

responsive to determining that the second authentication credentials satisfy the second authentication query; and transmitting, to the second device, the application upon a predetermined number of authentication techniques having been used as determined by a request counter that updates in connection with the authentication queries.

6. The computer readable storage medium according to claim 5, wherein the data transfer protocol standard is a hypertext transfer protocol (HTTP).

7. The computer readable storage medium according to claim 5, wherein the second authentication credential is selected from secure sockets layer certificates, authorization tokens, basic authentication, Kerberos authentication, remote authentication dial in user service (RADIUS), and security assertion markup language (SAML) mechanisms.

8. The computer readable storage medium according to claim 7, wherein a subsequent third authentication credential is selected from secure sockets layer certificates, authorization tokens, basic authentication, Kerberos authentication, remote authentication dial in user service (RADIUS), and security assertion markup language (SAML) mechanisms, and differs from the second authentication credential, ensured by the use of the request counter.

9. A communication apparatus comprising:
one or more processors; and
a memory storing one or more programs for exchanging data using a data transfer protocol between a first device and a second device, and comprising instructions for execution by the one or more processors, the one or more programs including instructions for:
receiving, at the first device, a first request message from a second device, the first request message requesting to download an application from the first device;
responsive to receipt of the first request message, sending, to the second device, a first response message having a first authentication query within header portions of the first response message;
receiving, at the first device, a second request message having first authentication credentials within header portions of the second request message, the first authentication credentials being responsive to the first authentication query;
determining whether the first authentication credentials satisfy the first authentication query;
responsive to determining that the first authentication credentials satisfy the first authentication query, sending, to the second device, a second response message having a second authentication query within header portions of the second response portion;
receiving, at the first device, a third request message having second authentication credentials within header portions of the third request message, the second authentication credentials being responsive to the second authentication query;
determining whether the second authentication credentials satisfy the second authentication query, wherein each of the first and second authentication credentials rely upon different security mechanisms;
responsive to determining that the second authentication credentials satisfy the second authentication query; and
transmitting, to the second device, the application upon a predetermined number of authentication techniques having been used as determined by a request counter that updates in connection with the authentication queries.

10. The communication apparatus according to claim 9, wherein the data transfer protocol standard is a hypertext transfer protocol (HTTP).

11. The communication apparatus according to claim 9, wherein the second authentication credential is selected from secure sockets layer certificates, authorization tokens, basic authentication, Kerberos authentication, remote authentication dial in user service (RADIUS), and security assertion markup language (SAML) mechanisms.

12. The communication apparatus according to claim 11, wherein a third subsequent authentication credential is selected from secure sockets layer certificates, authorization tokens, basic authentication, Kerberos authentication, and security assertion markup language (SAML) mechanisms, and differs from the second authentication credential, ensured by the use of the request counter.

13. A computer-implemented method for exchanging data using a data transfer protocol between a first device and a second device, the method comprising:
sending, at the first device, a first request message to a second device, the first request message requesting to download an application from the second device;
receiving, from the second device, a first response message having a first authentication query within header portions of the first response message, the first authentication query being responsive to the first authentication message;
responsive to receipt of the first authentication query, generating, at the first device, a first user interface to prompt an end user for first authentication credentials;
sending, at the first device, a second request message having the first authentication credentials within header portions of the second request message;
responsive to the second device determining that the first authentication credentials satisfy the first authentication query, receiving, from the second device, a second response message having a second authentication query within header portions of the second response;

responsive to receipt of the second authentication query, generating, at the first device, a second user interface to prompt an end user for second authentication credentials;

sending, at the first device, a third request message having the second authentication credentials within header portions of the third request message;

responsive to the second device determining that the second authentication credentials satisfy the first authentication query, wherein each of the first and second authentication credentials rely upon different security mechanisms; and receiving, from the second device, the application upon a predetermined number of authentication techniques having been used as determined by a request counter that updates in connection with the authentication queries.

14. The method according to claim 13, wherein the data transfer protocol standard is a hypertext transfer protocol (HTTP).

15. The method according to claim 13, wherein the second authentication credential is selected from secure sockets layer certificates, authorization tokens, basic authentication, Kerberos authentication, remote authentication dial in user service (RADIUS), and security assertion markup language (SAML) mechanisms.

16. The method according to claim 13, wherein a third subsequent authentication credential is selected from secure sockets layer certificates, authorization tokens, basic authentication, Kerberos authentication, remote authentication dial in user service (RADIUS), and security assertion markup language (SAML) mechanisms, and differs from the second authentication credential, ensured by the use of the request counter.

* * * * *